United States Patent
Vidrighin et al.

(10) Patent No.: US 11,829,049 B2
(45) Date of Patent: Nov. 28, 2023

(54) CASCADED RESONATORS PHOTON PAIR SOURCE

(71) Applicant: Psiquantum, Corp., Palo Alto, CA (US)

(72) Inventors: Mihai Dorian Vidrighin, Palo Alto, CA (US); Dylan Saunders, Mountain View, CA (US)

(73) Assignee: Psiquantum, Corp., Palo Alto, CA (US)

(*) Notice: Subject to any disclaimer, the term of this patent is extended or adjusted under 35 U.S.C. 154(b) by 0 days.

(21) Appl. No.: 17/875,256

(22) Filed: Jul. 27, 2022

(65) Prior Publication Data

US 2023/0025462 A1 Jan. 26, 2023

Related U.S. Application Data

(63) Continuation of application No. 17/231,973, filed on Apr. 15, 2021, now Pat. No. 11,442,334, which is a continuation of application No. 17/105,892, filed on Nov. 27, 2020, now Pat. No. 11,009,771.

(60) Provisional application No. 63/042,438, filed on Jun. 22, 2020, provisional application No. 62/941,407, filed on Nov. 27, 2019.

(51) Int. Cl.
  *G02F 1/35* (2006.01)
  *G02F 1/365* (2006.01)

(52) U.S. Cl.
  CPC .......... *G02F 1/3526* (2013.01); *G02F 1/3536* (2013.01); *G02F 1/365* (2013.01); *G02F 2201/06* (2013.01)

(58) Field of Classification Search
  None
  See application file for complete search history.

(56) References Cited

U.S. PATENT DOCUMENTS

| | | | |
|---|---|---|---|
| 6,897,434 B1 | 5/2005 | Kumar et al. | |
| 7,292,751 B2 | 11/2007 | Popovic | |
| 8,243,363 B2 | 8/2012 | Watanabe | |
| 9,052,448 B2* | 6/2015 | Hafezi | G02B 6/29331 |
| 9,952,482 B2 | 4/2018 | Rudolph et al. | |
| 10,126,506 B2 | 11/2018 | Mower et al. | |
| 10,372,014 B1 | 8/2019 | Vidrighin et al. | |

(Continued)

FOREIGN PATENT DOCUMENTS

KR 20110000159 A 1/2011

OTHER PUBLICATIONS

U.S. Appl. No. 17/105,892, "First Action Interview Pilot Program Pre-Interview Communication", dated Jan. 29, 2021, 4 pages.

(Continued)

*Primary Examiner* — Rhonda S Peace
(74) *Attorney, Agent, or Firm* — Kilpatrick Townsend & Stockton LLP

(57) ABSTRACT

A photon source includes a bus waveguide, a photon source pump laser coupled to the bus waveguide and a plurality of optical resonators coupled to the bus waveguide. Each optical resonator of the plurality of optical resonators has a respective resonance line width and a respective resonance frequency, wherein a bandwidth of the resonant center frequencies of the plurality of optical resonators is greater than a bandwidth of the photon source pump laser. The bus waveguide produces photons in response to receiving laser pulses from the pump laser.

20 Claims, 5 Drawing Sheets

(56) References Cited

U.S. PATENT DOCUMENTS

| 10,594,296 | B2* | 3/2020 | Rhee | H10N 30/302 |
|---|---|---|---|---|
| 2005/0220396 | A1 | 10/2005 | Kee et al. | |
| 2016/0041032 | A1 | 2/2016 | Matthews et al. | |
| 2017/0075190 | A1 | 3/2017 | Rudolph et al. | |

OTHER PUBLICATIONS

U.S. Appl. No. 17/105,892, "Notice of Allowance", dated Apr. 7, 2021, 9 pages.

U.S. Appl. No. 17/231,973, "Non-Final Office Action", dated Dec. 20, 2021, 9 pages.

U.S. Appl. No. 17/231,973, "Notice of Allowance", dated Apr. 29, 2022, 8 pages.

Gentry, et al., "Monolithic Source of Entangled Photons with Integrated Pump Rejection", In Conference on Lasers and Electro-Optics, OSA Technical Digest, 2018, 2 pages.

Joshi, et al., "Frequency Multiplexing for Quasi-Deterministic Heralded Single-Photon Sources", Nature Communications, Feb. 27, 2018, pp. 1-9.

Kumar, et al., "Controlling the Spectrum of Photons Generated on a Silicon Nanophotonic Chip", Nature Communications, Nov. 20, 2014, pp. 1-7.

PCT/US2020/062496, "International Preliminary Report on Patentability", dated Jun. 9, 2022, 8 pages.

PCT/US2020/062496, "International Search Report and Written Opinion", dated Mar. 9, 2021, 12 pages.

\* cited by examiner

CASCADED RESONATORS PHOTON PAIR SOURCE

CROSS-REFERENCES TO RELATED APPLICATIONS

This application is a continuation of U.S. patent application Ser. No. 17/231,973, filed Apr. 15, 2021, now U.S. Pat. No. 11,442,334; which is a continuation of U.S. patent application Ser. No. 17/105,892, filed Nov. 27, 2020, now U.S. Pat. No. 11,009,771, issued May 18, 2021; which claims priority to U.S. Provisional Patent Application No. 62/941,407, filed on Nov. 27, 2019, and to U.S. Provisional Patent Application No. 63/042,438, filed on Jun. 22, 2020, the disclosures of which are hereby incorporated by reference in their entirety for all purposes.

BACKGROUND

Photon pair sources are useful for various technologies. For example, photonic quantum technologies benefit from photon pair sources with improved brightness, spectral purity, reproducibility and manufacturability.

SUMMARY

In some embodiments, a photon source includes a bus waveguide, a pump laser coupled to the bus waveguide, and a plurality of optical resonators coupled to the bus waveguide. Each optical resonator of the plurality of optical resonators can have a respective resonance line width and a respective resonance frequency. In some embodiments, the frequency span of the resonant center frequencies of the plurality of optical resonators is greater than a bandwidth of the photon source pump laser.

In some embodiments, the photon source further includes a plurality of dispersive elements coupled to the bus waveguide, wherein one dispersive element of the plurality of dispersive elements is positioned in-between each adjacent pair of optical resonators of the plurality of optical resonators.

In some embodiments, a change in resonant center frequency between adjacent optical resonators is less than a resonant line width of each of the plurality of optical resonators.

In some embodiments, a quantity of the plurality of optical resonators is two. In other embodiments, the quantity of the plurality of optical resonators is greater than ten.

In some embodiments, the plurality of optical resonators is a first plurality of first optical resonators and each first optical resonator is coupled to a respective second optical resonator of a second plurality of optical resonators.

In some embodiments, the second plurality of optical resonators are coupled to a second waveguide that emits photons.

In some embodiments, the bus waveguide is an optical resonator.

In some embodiments, a photon source includes a bus waveguide having an input region and an output region and a plurality of optical resonators serially coupled to the bus waveguide between the input region and the output region. The output region can be configured to transmit photon pairs that are generated within the plurality of optical resonators in response to the input region receiving laser pulses. In some embodiments, each optical resonator of the plurality of optical resonator has a respective resonance line width and a respective resonance frequency.

In some embodiments, a frequency span of the resonant center frequencies of the plurality of optical resonators is greater than a bandwidth of the laser pulses received at the input region.

In some embodiments, further includes a plurality of dispersive elements coupled to the bus waveguide and a dispersive element of the plurality of dispersive elements is positioned between each optical resonator of the plurality of optical resonators.

In some embodiments, a change in resonant center frequency between adjacent optical resonators is less than a resonant line width of each of the plurality of optical resonators.

In some embodiments, a quantity of the plurality of resonant optical resonators is greater than 10.

In some embodiments, the plurality of optical resonators is a first plurality of first optical resonators and each first optical resonator is coupled to a respective second optical resonator of a second plurality of optical resonators.

In some embodiments, the bus waveguide is an optical resonator bus waveguide that recirculates the laser pulses. In some embodiments, the photon source further includes a plurality of optical resonator bus waveguides each optically coupled to a respective plurality of resonant optical resonators.

In some embodiments, for resonators in the plurality of resonators, a second resonator is positioned directly adjacent to a first resonator and a third resonator is positioned directly adjacent to the second resonator. The resonance frequency of the first resonator is larger than the resonance frequency of a second resonator. In addition, a resonance frequency of a third resonator may be less than the resonance frequency of the first resonator.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Figure 1A:
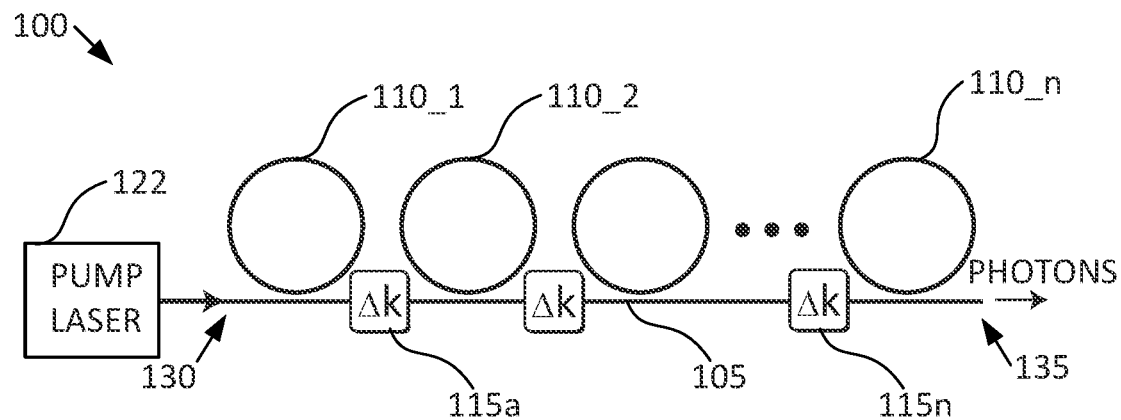
FIG. 1A is an illustration of a cascaded resonators photon pair source using a single bus, according to embodiments of the disclosure.

Techniques disclosed herein relate generally to photon pair sources. Such sources produce correlated photon pairs that each include photons commonly referred to as a signal photon and a herald photon. By detecting the herald photon, the presence of the signal photon is heralded for use.

In some embodiments, photon pair sources are constructed from integrated waveguiding structures in third-order or second-order nonlinear optical materials (e.g., silicon, silicon nitride, silicon-rich silicon nitride, germanium compounds, silicon-rich germanium, chalcogenide glasses, organic compounds, PZT, BTO, LiNb or the like). A pump laser is coupled to these waveguiding structures, such that spontaneous four wave mixing (SFWM) or spontaneous parametric down-conversion (SPDC) can occur. In an SFWM process, two pump laser photons may be converted into a pair of daughter photons (e.g., signal and herald photons) in the nonlinear optical material. Due to energy conservation, the signal and herald photons generated may be at frequencies that are symmetrically distributed around the pump frequency. In general, due to such a spectral correlation, the heralded signal photons can be in a mixed state in which case the source does not produce identical photons in subsequent trials. The frequency distribution of the generated pairs (defined by the joint spectral amplitude (JSA)) is controlled by the interplay between energy conservation and momentum conservation in the spontaneous pair generation process.

Some embodiments employ an optical resonator. In such embodiments the optical resonator reshapes the spectral density of states (defined by a spectral resonant enhancement), such that the photon pair generation is enhanced around resonance frequencies. An optical resonator may be implemented as a travelling wave resonating structure. One implementation is a loop in a waveguide shaped as a ring, racetrack, or other closed curve coupled to a bus waveguide. Another implementation uses mirrors and a semi-transparent mirror to form a closed beam path. An optical resonator may also be implemented as a standing wave resonating structure, such as a Fabry-Perot cavity, a distributed Bragg grating of a photonic crystal cavity.

Photon pair sources using optical resonators in integrated optics can be used to increase the brightness of SFWM photon pair generation compared to non-resonator versions, where brightness is the probability of producing a photon-pair per pump photon. The brightness increase is caused by the spectral resonant enhancement of the pump, signal and herald around resonant frequencies. To increase brightness, the following resonance conditions may be met: $v_p = V_{res}^M$, $v_s = V_{res}^{M-n}$, $v_h = V_{res}^{M+n}$. Here, $v_p$, $v_s$, $v_h$, are the frequencies of the pump, signal, and herald fields, respectively. Also, in $v_{res}$, upper script indicates the resonance number. M is a positive integer, and n is any integer. The resonance condition for order M is $$l_{eff} = \frac{Mc}{v_{res}M},$$

where $l_{eff}$ is the effective optical round-trip length of the resonator, and c is the speed of light. An optical resonator has multiple resonant frequencies. The frequency difference between two adjacent resonances M & M+1 is the free-spectral-range (FSR). The resonant enhancement is a Lorentzian distribution of the spectral density of states, centered at the resonance frequency, and with bandwidth (also referred to herein as the resonance line width) defined by the full width at half maximum (FWHM) of the distribution. The ratio FSR/FWHM is the finesse of the resonator. The brightness of the photon pair source using an optical resonator increases with increasing finesse.

In some embodiments based on a single optical resonator, the brightness of the source can be traded off with the bandwidth of the source. However, many systems that employ many single photon sources, e.g., for linear optical quantum computing, require that heralded photons from different sources interfere on a beamsplitter to created entangled states of the photons. However, in order for the heralded photons produced by two sources to interfere well, each source must be nearly identical to the other (e.g., the resonances must be nearly identical). This places a tight constraint on the alignment on the resonant frequencies of each resonator source if only a single resonator is used.

A source is spectrally pure if the JSA can be expressed as a product of a herald spectral distribution and a signal spectral distribution (the JSA is separable). In some embodiments of photon pair sources based on single optical resonators, the spectral purity can be optimized by tailoring the resonance bandwidth of the system at the herald, signal and pump resonances.

Techniques disclosed herein relate to cascaded resonators sources where the photon pairs generated in several optical resonators are coherently added together, which can result in enhanced spectral purity and brightness. By cascading multiple resonator sources on a single bus and coherently combining them the typical tradeoff between brightness and bandwidth of the resonances can be improved. In some embodiments, cascaded sources are disclosed that can produce substantially identical photons even if the resonators they are composed of have shifted resonant frequencies.

Cascaded resonators sources as described and disclosed herein can be used in any optical device, including but not limited to, quantum computing, quantum communications, quantum metrology, spectroscopy, LiDAR and other applications.

In order to better appreciate the features and aspects of sources that coherently combine multiple resonators on a single bus, further context for the disclosure is provided by discussing an implementation of a cascaded source according to embodiments of the present disclosure. These embodiments are for example only and other embodiments can be employed in other photon sources and photonic devices.

FIG. 1A illustrates a cascaded resonators photon pair source 100, according to embodiments of the disclosure. Cascaded resonators photon pair source 100 can include a waveguide 105 and a series of optical resonators 110_1, 110_2, . . . , 110_n, each having a different resonant frequency. Pumping light, e.g., from a laser pump 122, can be coupled to input region 130 of waveguide 105 and can be coupled into each ring resonator 110_1, 110_2, . . . , 110n. The pump laser may have a programed power spectral density and spectral chirp. Each optical resonator 110_1, 110_2, . . . , 110_n can include a waveguide loop such that a resonance for light having a certain wavelength may occur when the optical path length of the ring resonator is an integer number of the wavelength of the light. Each optical resonator can support multiple resonances at multiple wavelengths that meet the resonance condition.

Figure 1B:
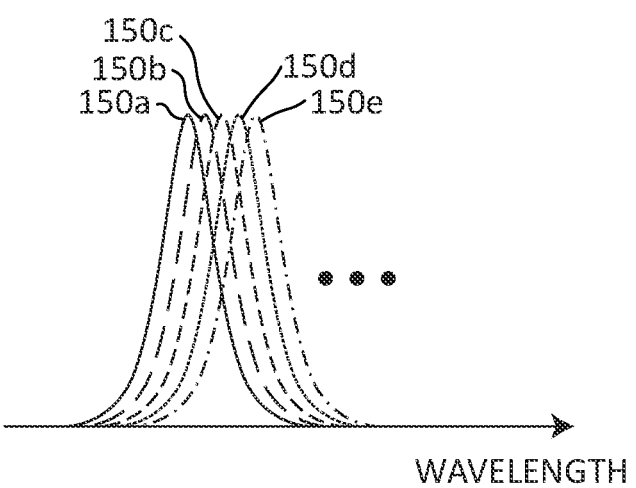
FIG. 1B is an illustration of a series of resonant spectral enhancements, according to embodiments of the disclosure.

FIG. 1B shows a plot of resonant enhancement of the spectral density of states and a function of wavelength for a plurality of resonators in accordance with some embodiments. Each distribution shown (also referred to herein as a resonance curve, or simply a resonance) is centered at a "resonance frequency" of a respective resonator, and the curves are referred to herein as a "resonator resonances." Each resonator resonance has a spectral width, defined to be the full width at half maximum (FWHM) of the distribution. This width is referred to herein as the "resonance line width." The resonance frequencies for pump, signal and herald are given by $v_{p,j}$, $v_{s,j}$, $v_{h,j}$ where j labels the resonators structures themselves, e.g., the rings shown in FIG. 1A. However, it is important to note that the index j (which counts resonances in order of increasing resonance frequency in FIG. 1B), is not coupled to the index n above (which represents the physical position of the resonator on the bus), i.e., the resonance frequencies of the resonators as one travels from the input end to the output end need not increase monotonically or even be in increasing (or decreasing order). In FIG. 1B, the resonator resonances (for either of the three fields) is illustrated for 5 optical resonators (which could be positioned anywhere along the bus), where index j goes from 1-5 corresponding to 150a-150e. The shift in the resonance frequency (also referred to herein as a resonance shift) between different resonators may be obtained by a small change of the optical resonator waveguide width or the optical resonator length or another resonator property.

Returning to FIG. 1A, a series of optical resonators are optically coupled to the bus and the individual resonance frequencies of the series of resonators can be chosen to improve brightness and purity of the pair of photons that are generated by the source. In the figure, resonators are labeled, 110_1, 110_2, . . . , 110_n, where the index n indicates the physical position of the resonator relative to the input side of the device (with 110_1 being the first input resonator, 110_2 being the second resonator positioned directly adjacent to resonator 110_1, etc.). In some embodiments, the series of resonance frequencies of the series of the resonators along the device (from input to output, or vice versa) can be can be ordered (increasing, decreasing) and equally spaced. In other embodiments the resonance frequencies of the resonators indexed by n may not be a monotonically increasing or decreasing function of n as one moves down the device, i.e., a resonance frequency of a first resonator can be larger than a resonance frequency of a second resonator (where the second resonator is positioned directly adjacent to the first resonator) and a resonance frequency of a third resonator (where the third resonator is positioned directly adjacent to the second resonator) may be less than the resonance frequency of the first resonator. In some embodiments, having the second resonance frequency smaller than the first resonance frequency and the third resonance frequency larger than the first may improve the spectral purity of the source. As used herein, the term "frequency span" of the resonant frequencies $v_{p,n}^M$ the difference between the largest and smallest of these frequencies.

Some embodiments may use an additional optional dispersive element which adjusts the optical phase between pump, signal, and idler between two optical resonators. FIG. 1 illustrates such a device 100 where Δk 115a is a momentum miss-match between pump, signal, and idler. In some embodiments the dispersive element can be implemented using any type of dispersion structure including but not limited to a waveguide with a different geometry, a chirped grating, by multimode dispersion engineering, or a chirped mirror. The dispersive element can be coupled to the bus in any way, e.g., can be formed directly from and/or integrated into the bus waveguide or optically coupled to the bus (via direct coupling or evanescent coupling and the like).

In accordance with some embodiments, the resonator resonances of resonators can overlap, as shown in FIG. 1B. That is to say, that if the resonator resonances are plotted as a function for wavelength (or equivalently, frequency) the area under the curves substantially overlaps. In some embodiments, two resonator resonance are defined to be overlapping if the difference between their respective resonance frequencies is smaller than the twice the resonance line width of one of the two resonances. In some embodiments, the difference between resonance frequencies that are defined to be overlapping can be a few hundred picometers, e.g., 100 picometers, or within a range of 50 to 400 picometers (5-50 GHz when using frequency units).

In some embodiments the pump pulse spectrum is a Gaussian with a controlled bandwidth. Here the term bandwidth refers to the FWHM of the pump power spectral density. In some embodiments the pump spectrum has a controlled spectral chirp (a non-zero quadratic spectral phase). The FWHM of the pump spectrum may be less than the frequency span of the resonances $v_{p,j}^M$.

Figure 2A:
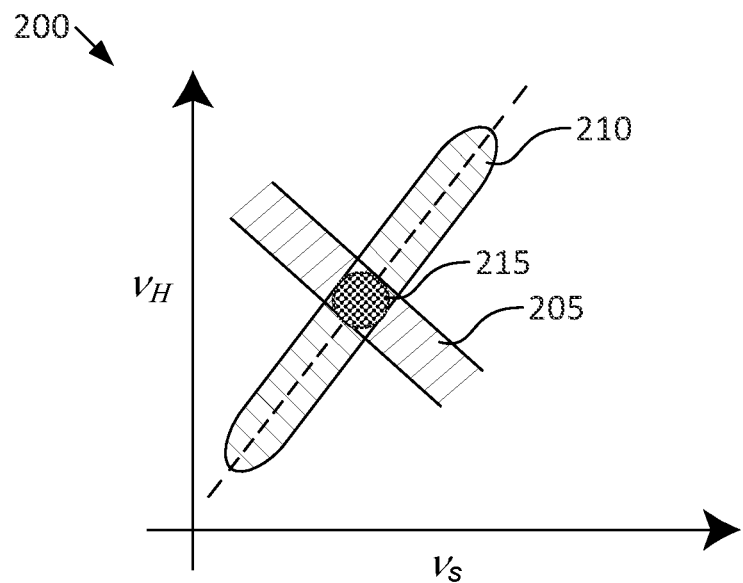
FIGS. 2A-2B illustrates an approximate graphical depiction of the joint spectral amplitude of generated photons from a cascaded resonators photon pair source, according to embodiments of the disclosure.

FIG. 2A illustrates graph 200 of a JSA of a cascaded resonators photon pair source 100. Region 205 illustrates the pump function, which accounts for energy conservation of the photon pair generation from a pump pulse. Region 210 illustrates the collective spectral resonant enhancement due to the multitude of resonators in the cascaded resonators source. This region is approximately orthogonal to the pump function as the spectral enhancements for the pump, signal, and herald are shifted together from one resonator to another. The interplay of the pump function and collective spectral enhancement can lead to a JSA that is approximately a 2D Gaussian distribution, illustrated by the region 215. This JSA can be made approximately separable, which leads to high spectral purity. Cascaded resonators source 100 can be a relatively bright, spectrally pure photon pair source. High purity implies >99%, while low or standard purity is approximately 90%. In some embodiments, for example, the purity of the JSA illustrated in region 215 can be 99.9 percent, however in other embodiments the purity may be different.

Cascaded resonators source 100 can be robust to long range process variation. More specifically, fabrication imperfections often lead all $v_{p,j}$, $v_{s,j}$, $v_{h,j}$ to shift together. If all resonance frequencies of a cascaded resonators source are shifted together, the pump "selects" a subset of resonators 110_1, . . . , 110_n to interact with. The resulting JSA can be nearly identical to the JSA of the nominal source.

Figure 2B:
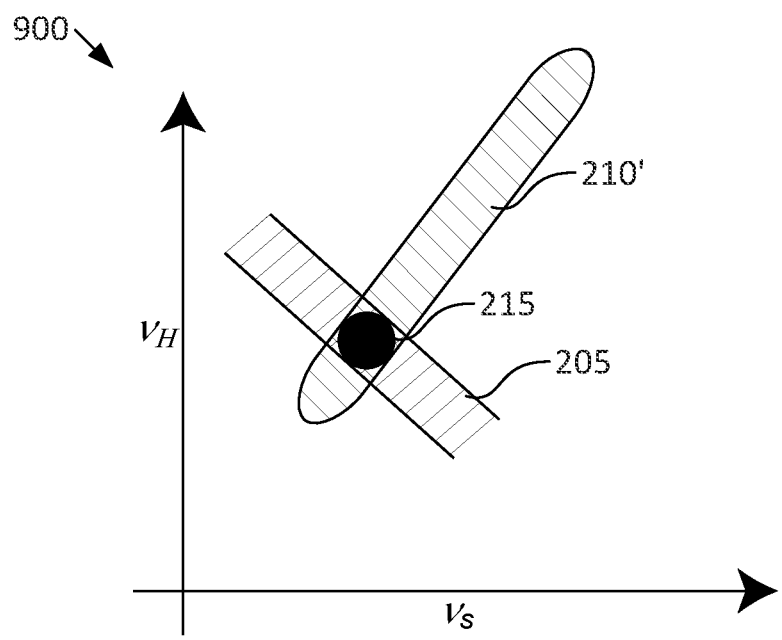

FIGS. 2B illustrate a graph of a cascaded resonators source showing the effect of process variability on the JSA. FIG. 2A illustrates the collective spectral enhancement of a nominal source, and FIG. 2B shows a source affected by shift in all resonance frequencies due to process variations e.g. a waveguiding film thickness change. In this configuration the result of the process variation is merely to shift the collective spectral resonant enhancement to a new position the 210'. However, because the frequency span of the collective spectral resonant enhancement is larger than the shift caused by the process variation, region 215 is largely unaffected. This enables the system to be robust to manufacturing process variability.

The above explanation of the characteristics and operation may be considered an approximation and/or simplification and this disclosure is in no way limited by these explanations. In some embodiments a full simulation infrastructure includes pump propagation, dispersion, nonlinearities, losses, multi-photons, non-perturbative effects, and other considerations.

Figure 3:
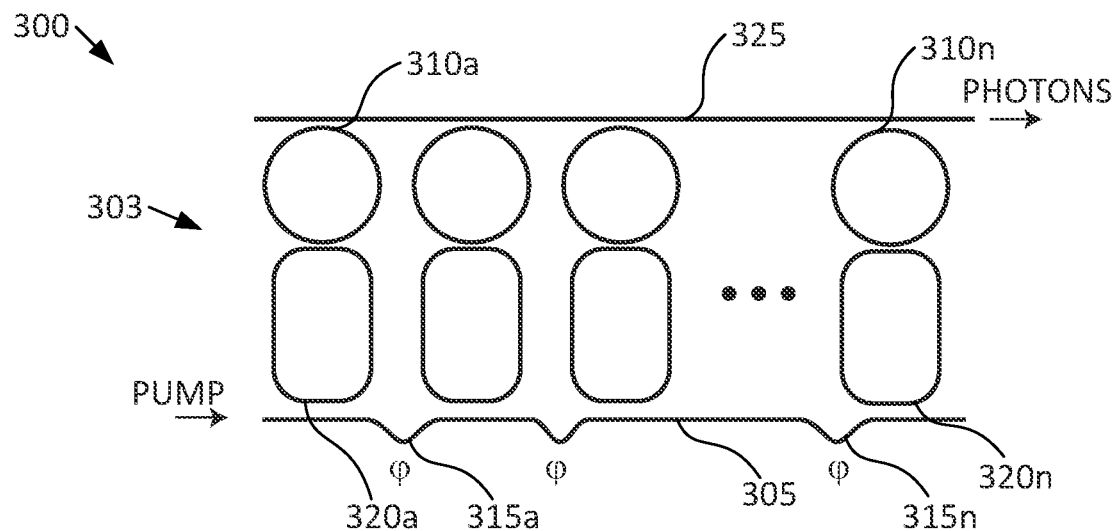
FIG. 3 is an illustration of a cascaded resonators photon pair source that includes separate pump and photon buses, with coupled optical resonators, according to embodiments of the disclosure.

FIG. 3 illustrates an embodiment of a cascaded source 300, according to embodiments of the disclosure. In this embodiment a series of optical resonators 303 includes a row of optical resonators 310a . . . 310n and another row of optical resonators 320a . . . 320n, however in other embodiments the series of optical resonators can have other suitable shapes than in this illustration. Series of optical resonators 303 are disposed between a first waveguide 305 and a second waveguide 325. A laser pump source is coupled to the first waveguide 305 that is positioned to couple light into each optical resonator 320a . . . 320n. Each optical resonator 320a . . . 320n is separated by a respective phase shift 315a . . . 315n (labeled as φ). Each optical resonator 320a . . . 320n is positioned to couple light to a respective optical resonator 310a . . . 310n which couples light into the second waveguide 325.

In other embodiments, coupled optical resonators could be used in place of single optical resonators. In further embodiments, a quasi-phase matching technique could be used where spatially modulated nonlinear properties are used to engineer momentum matching in the pair generation process.

The photon pair sources described above can result in myriad improvements in performance including, but not limited to the following. Firstly, the disclosed structures can decouple the bandwidth of a heralded photon from the source brightness. In comparison, previous optical resonator photon pair sources achieve higher brightness by narrowing the resonance frequency. In the cascaded resonators source disclosed herein this constraint is removed thereby growing the design space considerably. For example, bandwidth may be chosen given other system considerations.

A second improvement with the photon pair sources described herein is that two separate photon pair sources can produce substantially identical heralded photons if the two photon pair sources share substantially identical pumps, independent of resonance frequency shifts imparted by long range process variations to all optical resonators. This feature allows for different photon pair sources to produce substantially identical heralded photons. This can reduce the required trimming and/or tuning by orders of magnitude to achieve frequency alignment for different photon pair sources.

A third improvement is that the photon pair sources described herein can produce Gaussian photons. In some embodiments a Gaussian distribution is a desirable single photon wave-packet shape, as it is robust against dispersion, timing jitter etc. In comparison, typical single optical resonator sources do not produce Gaussian photons.

Another advantage is that the photon pair sources described herein can achieve high spectral purity.

Figure 4:
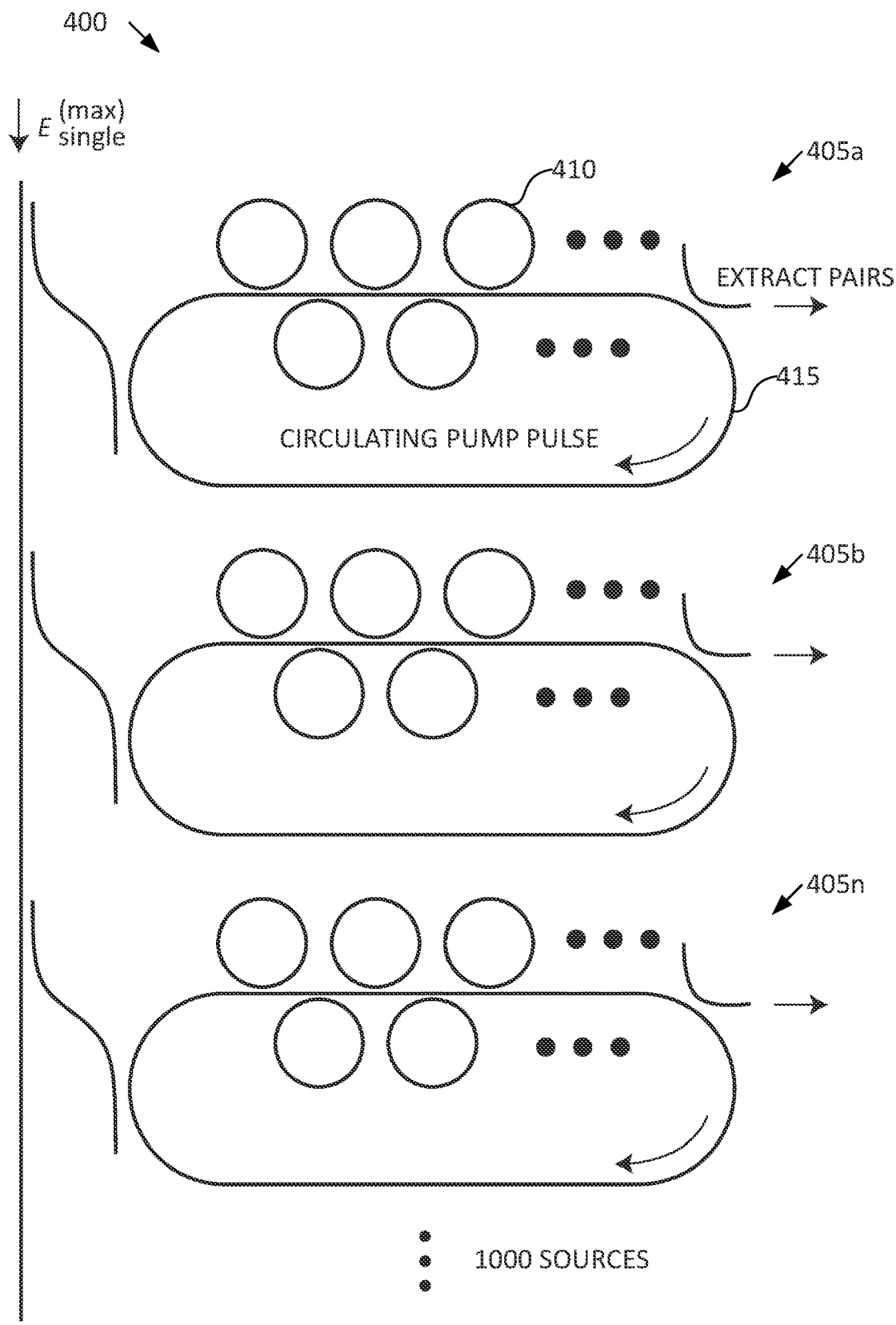
FIG. 4 illustrates a simplified diagram of a pump recycling design for a cascaded resonators photon pair source, according to embodiments of the disclosure.

FIG. 4 illustrates a simplified diagram of one embodiment of a compact pump recycling cascaded source 400. As shown in FIG. 4 recycling cascaded resonators source 400 includes a plurality of recirculating resonant structures 405a . . . 405n that each include a plurality of rings 410 coupled to a respective resonant bus 415. In some embodiments cascaded source 400 provides an additional benefit that when the pump exits the source it is not altered spectrally, it is only delayed. If the bus waveguide is turned into a resonator, this additional delay induced by the cascaded resonators source can allow for matching the cavity length for synchronously pumping the source. More specifically, when the pump laser repetition rate matches the delay accumulated in the cascaded resonators source, the pump pulse can be enhanced by the cavity, thus significantly reducing the required external pump power. In some embodiments, when critically coupled, a further enhancement by a factor up to two orders of magnitude can be generated.

Although the cascaded sources are described and illustrated as one particular type of source, embodiments of the disclosure are suitable for use with a multiplicity of systems including, but not limited to quantum computers and LiDAR systems. The collective spectral enhancement produced via cascaded resonators can be used by, but is not limited to, any parametric wave mixing process (for e.g., Single Harmonic Generation, Difference Frequency Generation (DFG) and/or Optical Parametric Oscillation).

Figure 5:
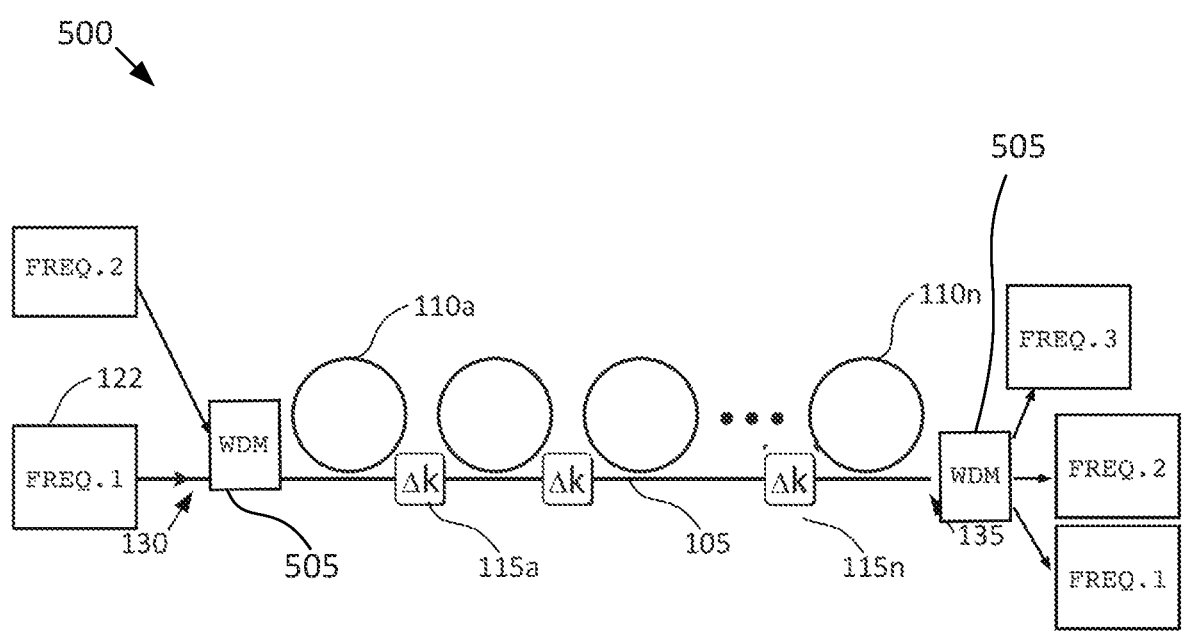
FIG. 5 illustrates a frequency conversion system employing a cascaded resonance structure in accordance with some embodiments.

FIG. 5 shows a frequency conversion system 500 based on a cascaded resonator structure in accordance with some embodiments. The structure is similar to the photon pair source structure described above in detail with respect to FIG. 1 and repeated elements are not described here for the sake of clarity. In some embodiments, the input to the cascaded resonators frequency conversion system can include two lasers, FREQ.2 and FREQ.1, each with a different frequency. These lasers can be input on a light combining device such as a wavelength division multiplexing device, shown here as WDM 505. In this case, the cascaded resonators structure can generate frequency mixing between the inputs, such as difference or sum frequency generation. In some embodiments an output WDM 515 can be employed to separate the converted frequency (e.g., the sum and/or difference frequencies) from the input laser light generated by the lasers FREQ.2 and FREQ.1. This frequency conversion can be useful for generating a new frequency from FREQ.2 and FREQ.1 when FREQ.2 and FREQ.1 may not be as useful as the converted frequency. For example, perhaps FREQ.2 and FREQ.1 are not easily detected but the converted frequency is much or readily detected by available detectors. The cascaded resonators frequency conversion structure can improve the brightness of frequency mixing when compared to other methods for frequency conversion including waveguides or single optical resonators.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

What is claimed is:

1. A photon source comprising:
   a bus waveguide;
   a pump laser coupled to the bus waveguide; and
   a plurality of recirculating resonant structures coupled to the bus waveguide, wherein each of the plurality of recirculating resonant structures includes a resonant bus and a plurality of optical resonators coupled to the resonant bus, wherein each optical resonator of the plurality of optical resonators has a resonance line width and the resonance line width of each optical resonator of the plurality of optical resonators overlaps with the resonance line width of at least one adjacent optical resonator of the plurality of optical resonators.

2. The photon source of claim 1 wherein each optical resonator of the plurality of optical resonators has a resonance center frequency.

3. The photon source of claim 2 wherein the pump laser has a pump bandwidth and a frequency span of the resonance center frequencies of the plurality of optical resonators is greater than the pump bandwidth.

4. The photon source of claim 2 wherein a change in resonance center frequency between adjacent optical resonator of the plurality of optical resonators is less than the resonance line width of each of the plurality of optical resonators.

5. The photon source of claim 2 wherein, for optical resonators of the plurality of optical resonators:
   a resonance center frequency of first optical resonator is larger than a resonance center frequency of a second optical resonator;
   a resonance center frequency of a third optical resonator is less than the resonance center frequency of the first optical resonator;
   the second optical resonator is positioned directly adjacent to the first optical resonator; and
   the third optical resonator is positioned directly adjacent to the second optical resonator.

6. The photon source of claim 2 wherein a difference between the resonance center frequencies of any two optical resonators of the plurality of optical resonators is less than or equal to twice the resonance line width of one of the plurality of optical resonators.

7. The photon source of claim 1 wherein a quantity of the plurality of recirculating resonant structures is greater than ten.

8. The photon source of claim 7 wherein a quantity of the plurality of optical resonators in each of the plurality of recirculating resonant structures is greater than ten.

9. The photon source of claim 1 further comprising a plurality of second waveguides, wherein each of the plurality of second waveguides is coupled to one of the plurality of recirculating resonant structures and operable to emit a photon pair.

10. The photon source of claim 1 wherein each of the plurality of recirculating resonant structures is coupled to the bus waveguide via an incoupling optical waveguide.

11. A method of generating photon pairs, the method comprising:
    coupling a pump laser to a bus waveguide;
    coupling a plurality of recirculating resonant structures to the bus waveguide, wherein each of the plurality of recirculating resonant structures includes a resonant bus and a plurality of optical resonators coupled to the resonant bus;
    injecting pump light from the pump laser into the bus waveguide;
    coupling a portion of the pump light into each of the plurality of recirculating resonant structures;
    circulating the portion of the pump light in the resonant bus of each of the plurality of recirculating resonant structures; and
    generating a photon pair in at least one of the plurality of recirculating resonant structures.

12. The method of claim 11 wherein each optical resonator of the plurality of optical resonators has a resonance line width and the resonance line width of each optical resonator of the plurality of optical resonators overlaps with the resonance line width of at least one adjacent optical resonator of the plurality of optical resonators.

13. The method of claim 11 wherein the pump laser has a pump bandwidth and each optical resonator of the plurality of optical resonators has a resonance center frequency, wherein the frequency span of the resonance center frequencies of the plurality of optical resonators is greater than the pump bandwidth.

14. The method of claim 11 further comprising extracting the photon pair using a set of waveguides coupled to the one of the plurality of recirculating resonant structures.

15. The method of claim 11 wherein the pump light exiting the bus waveguide is not altered spectrally.

16. The method of claim 11 further comprising:
    injecting additional pump light into the bus waveguide at a pump repetition period; and
    coupling a portion of the additional pump light into each of the plurality of recirculating resonant structures, wherein a round trip time for portion of the pump light circulating in each of the plurality of recirculating resonant structures is equal to the pump repetition period.

17. The method of claim 11 wherein each optical resonator of the plurality of optical resonators is serially coupled to the resonant bus.

18. The method of claim 11 wherein a quantity of the plurality of optical resonators is greater than ten.

19. The method of claim 11 wherein a quantity of the plurality of recirculating resonant structures is greater than ten.

20. The method of claim 11 wherein, for optical resonators of the plurality of optical resonators:
    a resonance center frequency of a first optical resonator is larger than a resonance center frequency of a second optical resonator;
    a resonance center frequency of a third optical resonator is less than the resonance center frequency of the first optical resonator;
    the second optical resonator is positioned directly adjacent to the first optical resonator; and
    the third optical resonator is positioned directly adjacent to the second optical resonator.

* * * * *